United States Patent
Fincher et al.

(10) Patent No.: US 7,313,052 B2
(45) Date of Patent: Dec. 25, 2007

(54) SYSTEM AND METHODS OF COMMUNICATING OVER NOISY COMMUNICATION CHANNELS

(75) Inventors: Roger W. Fincher, Conroe, TX (US); Larry A. Watkins, Houston, TX (US); Peter S. Aronstam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 231 days.

(21) Appl. No.: 11/102,006

(22) Filed: Apr. 8, 2005

(65) Prior Publication Data

US 2006/0227005 A1  Oct. 12, 2006

(51) Int. Cl.
*H04H 9/00* (2006.01)
(52) U.S. Cl. .................. 367/83; 340/853.2; 340/854.3
(58) Field of Classification Search .............. 367/83; 340/854.3, 853.2, 855.4
See application file for complete search history.

(56) References Cited

U.S. PATENT DOCUMENTS

| 5,055,837 | A * | 10/1991 | Abdallah et al. ............. 367/83 |
| 6,023,658 | A | 2/2000 | Jeffryes |
| 6,501,804 | B1 | 12/2002 | Rudolph et al. |
| 6,741,185 | B2 | 5/2004 | Shi et al. |
| 2006/0114747 | A1 * | 6/2006 | Hentati et al. ................ 367/83 |

OTHER PUBLICATIONS

M. Speth, S. A. Fechtel, G. Fock, & H. Myr, Optimum Receiver Design for Wireless Broad-Band Systems Using OFDM-Part 1, IEEE Transactions on Communications, vol. 47, No. 11, Nov. 1999.
M. Speth, S. A. Fechtel, G. Fock & H. Meyr, Broadband Transmission Using OFDM: System Performance and Receiver Complexity, Lehrstuhl fur Integrierte Systems der Signalverarbei Feb. 1998.
M. Speth, S.A. Fechtel, G. Fock & H. Meyr, Optimum Receiver Design for OFDM-Based Broadband Transmission-Part II: A Case Study, IEEE Transactions on Communications, vol. 49, Apr. 2001.

* cited by examiner

*Primary Examiner*—Timothy Edwards, Jr.
(74) *Attorney, Agent, or Firm*—Madan, Mossman & Sriram P.C.

(57) ABSTRACT

A system and methods of transmitting information between a first location and a second location comprise transmitting a data signal and a known signal from one of the first location and the second location over a signal channel having a first noise component. A second noise component is measured in a noise channel adjacent the signal channel. The data signal, the known signal, and the first noise component are received at the other location. The first noise component is estimated based on the second noise component. The estimated noise component is combined with the received data signal and the received known signal to generate noise-cancelled received data and received known signals. The noise-cancelled received known signal is processed to obtain an estimate of the channel transfer function. The estimated channel transfer function is combined with the noise-cancelled received data signal to reconstruct the transmitted data signal.

41 Claims, 11 Drawing Sheets

SYSTEM AND METHODS OF COMMUNICATING OVER NOISY COMMUNICATION CHANNELS

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

This invention relates generally to communication between separated devices and more particularly to communication across noisy communication channels.

BACKGROUND

Many industries rely on communication between separated devices for data transfer wherein the data transferred may include, but is not limited to, sensor readings, safety and control commands, and status information. It is common that such communications are carried over communication channels wherein unwanted noise impairs the reception of the data.

As one example, and not intended as a limitation, the petroleum industry relies heavily on the operation of drilling into the earth, both on land and offshore, in the exploration for and production of petroleum products. Over the years, the more readily found and accessible petroleum reservoirs have of course been discovered and depleted first. As a result, the exploration and production operations must necessarily concentrate to a greater degree on less accessible and less readily discoverable reserves. In order to reach these locations, the depths of drilling have increased, the locations at which drilling takes place have become increasingly difficult and less accessible, and the drilling operations have necessarily become more complex. Accordingly, drilling operations in the search for and production of petroleum products have become more expensive, with this trend likely to continue in the future. Because of this increasing cost, the accuracy and efficiency of the drilling operation is becoming even more important.

The success and efficiency of the drilling operation depends to a large degree on the quantity and quality of information that the drilling operator has about the subsurface structure into which the drilling is taking place, and also about parameters concerning the operation of the drill bit as it proceeds into the earth. Many techniques for acquisition and communication of such information have been tried and used in the industry. Examples of such telemetry systems include fluid acoustic and mud pulse telemetry that both use the drilling fluid as a transmission medium, electromagnetic (EM) telemetry through the earth, and acoustic stress-wave telemetry using the drill string material as a transmission medium. In general, the oil drilling industries need is to effectively increase data transmission rates to accommodate the ever increasing amount of measured downhole data. Common transmission rates to date are in the range of 2-10 bits per second. Desirable data rates using the techniques described are on the order of 100-1000 bits per second. Typically, in these transmission systems, the received data signal is, at best, of the same order of magnitude as the noise. At higher transmission rates, the signal-to-noise ratio (SNR) will be substantially less than one.

In any transmission system, a wide collection of unknown possible noise sources are likely to exist. These noises are most troubling if of the same nature (frequency and phase) and magnitude as the planned transmission. That is, for example, if the transmission mode is EM then stray electrical noise is likely to be added to the transmitted signal. If the transmission mode is acoustic, then mechanical and other vibration related noise will be in the signal stream. If the transmission is mud pulse, then pump pulsations and fluid turbulence generated pulsations may be added to the signal. For the most part, these and other random noises are always present and can not be prevented from entering the data signal, therefore a technique to remove them at the receiving end is of great interest.

The electrical noise is likely to come from within and outside the above discussed elements. Electric noise from within is likely to be transmitted as part of the 'data' stream while external electrical noise is likely to simply appear in the 'data' stream from outside sources.

Acoustic system will be prone to the same internal noise issue and the electrical noise maybe transmitted as part of the projected signal. Like external electrical noise, external mechanical noise or vibration may be super imposed on to the data stream.

Other applications experience similar noise problems. For example, transmission between production devices in a well and either subsurface or surface located controllers may be hampered by noise. Likewise, multiple production systems in multiple wells may be used to produce a single reservoir or multiple reservoirs in a certain area. The multiple control systems may be interlinked to a common controller to enhance production. Such systems may be linked, for example, by hardwire or radio frequency systems that experience noise in the communication channels. Another application includes sub-sea acoustic safety communication for control of subsurface safety valves in case of a loss of other communication capabilities.

In general, for such telemetry systems, the receiving system will need to be able to remove these noise signals from the data stream. There is a demonstrated need for a system and method for extracting data signals from relatively high noise communication paths.

SUMMARY

In one aspect of the present invention, a system for transmitting information between a first location and a second location, comprises a transmitter disposed at one of the first location and the second location and transmitting a data signal and a known signal over a signal channel having a noise component therein. A receiver is disposed at the other of the first location and the second location and receives the data signal, the known signal, and the noise component. A control unit is operatively connected to the receiver and processes the received known signal to obtain an estimate of the channel transmission function. The estimated transmission function is combined with the received data signal to reconstruct the transmitted data signal.

In another aspect, a method of transmitting information between a first location and a second location comprises transmitting a data signal and a known signal from one of the first location and the second location over a signal channel having a noise component. The data signal and the known signal and the noise component are received at the other of the first location and the second location. The received known signal is processed to obtain an estimate of the channel transmission function. The estimated transmission function is combined with the received data signal to reconstruct the transmitted data signal.

In yet another aspect, a method of transmitting information between a first location and a second location comprises transmitting a data signal and a known signal from one of the first location and the second location over a signal channel having a first noise component. A second noise component is measured in a noise channel adjacent the signal channel. The data signal, the known signal, and the first noise component are received at the other of the first location and the second location. The first noise component is estimated based on the second noise component. The estimated first noise component is combined with the received data signal and the received known signal to generate a noise-cancelled received data signal and a noise-cancelled received known signal. The noise-cancelled received known signal is processed to obtain an estimate of the channel transfer function. The estimated channel transfer function is combined with the noise-cancelled received data signal to reconstruct the transmitted data signal.

In another aspect, a computer readable medium containing a set of executable instructions that when executed by a computer perform a method of transmitting information between a first location and a second location comprises transmitting a data signal and a known signal from one of the first location and the second location over a signal channel having a noise component. The data signal and the known signal and the noise component are received at the other of the first location and the second location. The received known signal is processed to obtain an estimate of the channel transmission function. The estimated transmission function is combined with the received data signal to reconstruct the transmitted data signal.

BRIEF DESCRIPTION OF THE DRAWINGS

For a detailed understanding of the present invention, references should be made to the following detailed description of the preferred embodiment, taken in conjunction with the accompanying drawings, in which like elements have been given like numerals, wherein.

DESCRIPTION

The description that follows depicts, in one embodiment, a mud pulse transmission system for transmitting information between a surface location and a downhole location in a well, and is intended as an example of the present invention and not as a limitation. Such transmissions may encompass two-way communication. One skilled in the art will appreciate that the noise reducing transmission scheme described herein is applicable to any other suitable signal transmission scheme, including, but not limited to, radio frequency (RF) transmission, electromagnetic (EM) transmission, acoustic transmission, and optical transmission.

Figure 1:
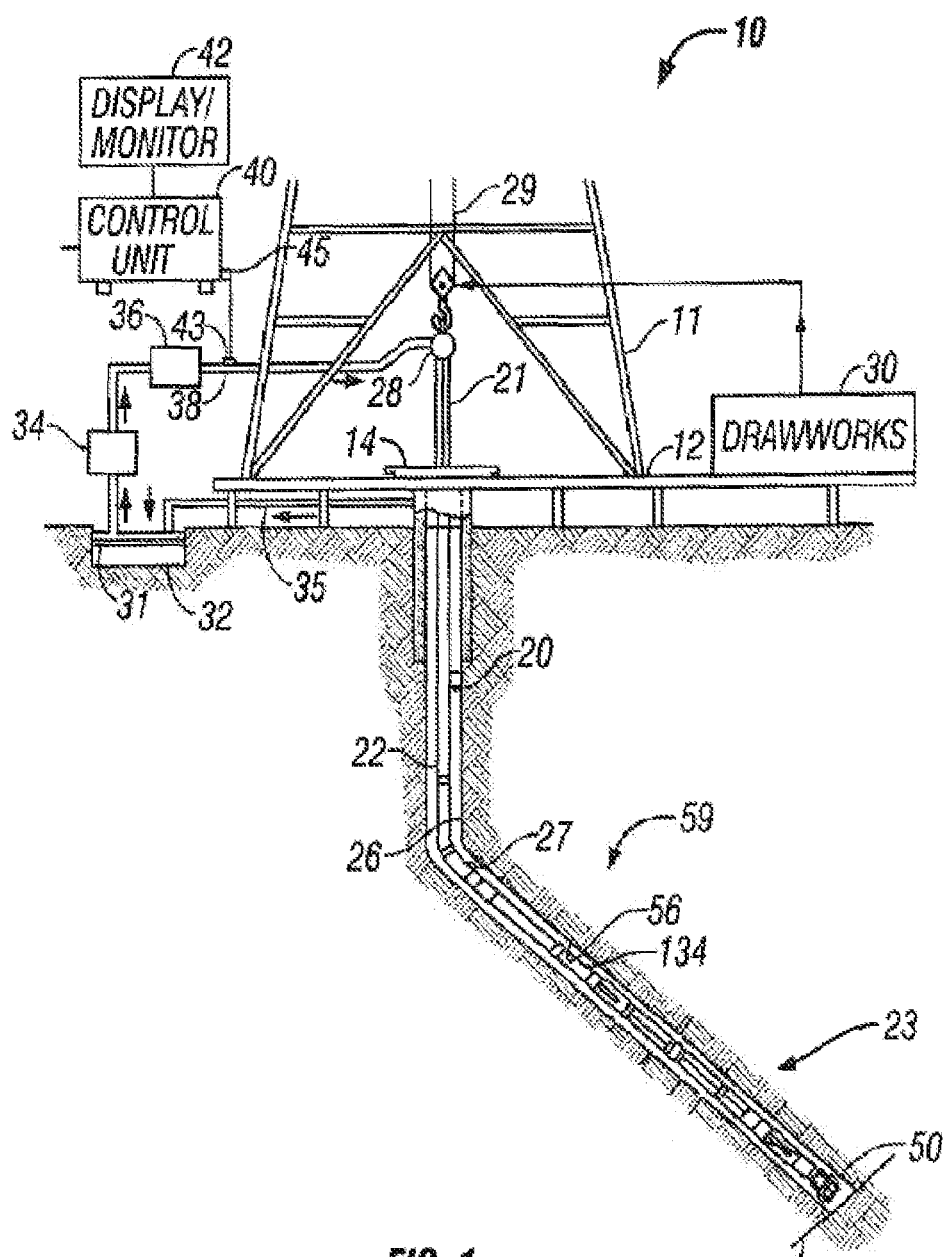
FIG. 1 depicts a drilling system suitable for use in the present invention.

FIG. 1 shows a schematic diagram of a drilling system 10 having a downhole assembly containing a downhole sensor system and surface devices according to one embodiment of the present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formation 23 when it is rotated. The drill string 20 is coupled to a draw works 30 via a kelly joint 21, swivel 28 and line 29 through a system of pulleys (not shown). During the drilling operations, the draw works 30 is operated to control the weight on bit and the rate of penetration of the drill string 20 into the borehole 26. The operation of the draw works is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a de-surger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

In one embodiment of the present invention, the downhole drilling assembly 59 (also referred to as the bottomhole assembly or "BHA") which contains the various sensors and MWD devices to provide information about the formation 23 and downhole drilling parameters, is coupled between the drill bit 50 and the drill pipe 22.

Referring to FIG. 1, the BHA 59 also contains downhole sensors and devices in addition to the above-described surface sensors to measure downhole parameters of interest. Such devices include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The above-noted devices transmit data to the downhole pulser 134, also called a transmitter, which in turn transmits the data uphole to the surface control unit 40. In one embodiment, the present invention utilizes a mud pulse telemetry technique to communicate data from downhole sensors and devices during drilling operations. A transducer 43 placed in the mud supply line 38 detects the mud pulses responsive to the data transmitted by the downhole pulser 134. Transducer 43, also called a receiver, generates electrical signals in response to the mud pressure variations and transmits such signals via a conductor 45 to the surface control unit 40. Alternatively, other telemetry techniques such as electromagnetic and acoustic techniques or any other suitable technique may be utilized for the purposes of this invention.

The transmitter 134 is used to place the data stream into the drilling fluid 31 that is the media being used for signal transport. Once the signal is injected into the media of transport, many aspects of the media and the media's interface with the environment are constantly altering the transmitted signal. Many different properties of the media will influence the behavior of the transmission path. The net effect can be so great that the signal received by the receiver 43 is unlikely to look much like the transmitted signal. This effect is generally known as a transfer function of the transmission channel and is often denoted by $H_{(\omega)}$. If the transfer function $H_{(\omega)}$ is known, one skilled in the art will appreciate that the inverse of the transfer function can be applied in $\omega$ space (frequency domain) to the received signal to reverse transform it into a semblance (near likeness) of the transmitted signal. Like noise on the transmitting end of the system, noises on the receiving end will also impact the received data stream. For example for the mud pulse transmission system, near source noise for downhole transmitted signals include the fluid turbulence pressure variations from the bit that may propagate back up the internal mud path inside the drill string. In addition, the mechanical vibrations of the bottom hole assembly may be coupled to the drilling fluid as pressure fluctuations. These pressure noise signals propagate along with the desired data signals to the surface receiver.

Figure 2:
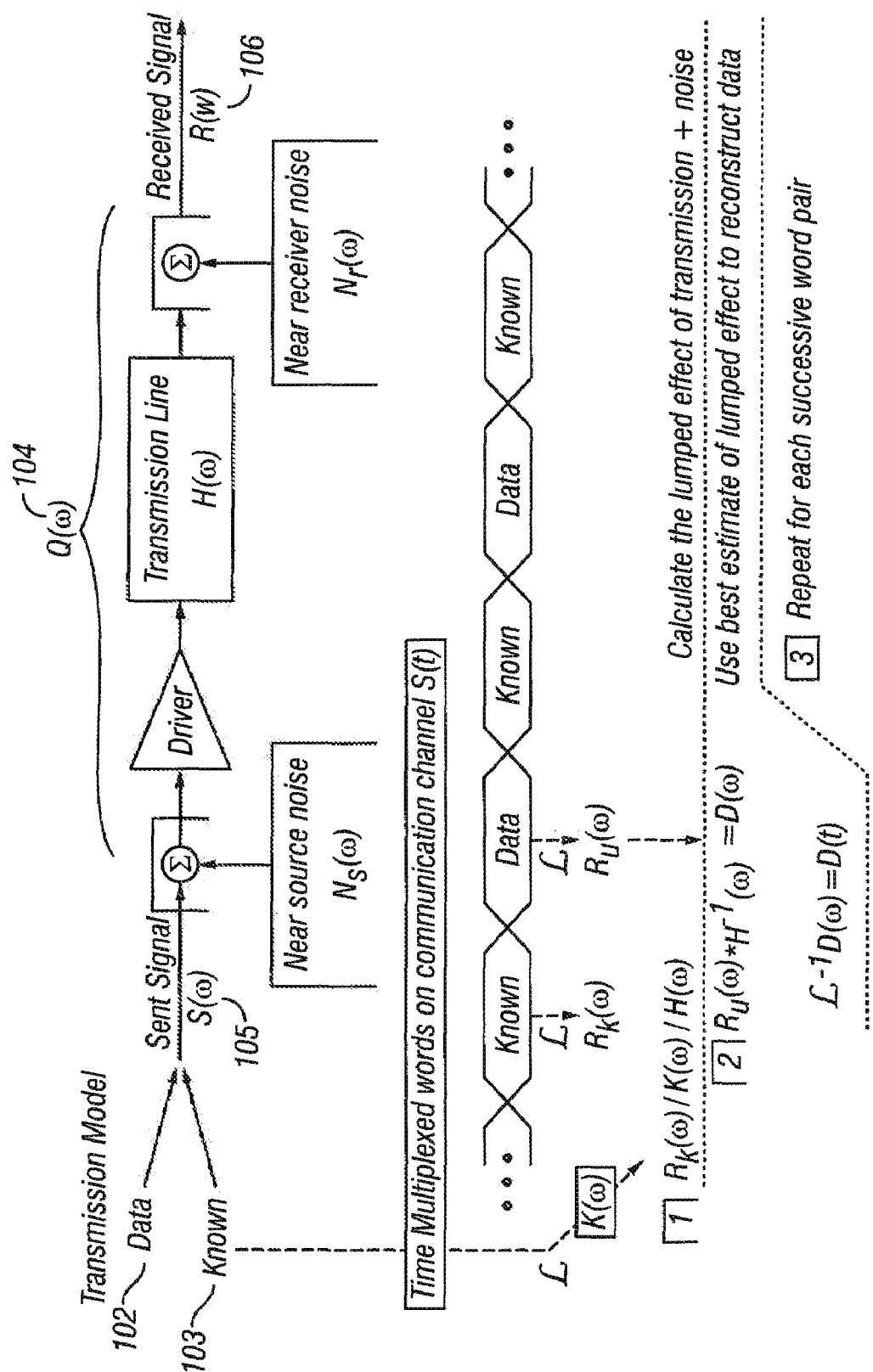
FIG. 2 is a block diagram depicting a single channel transmission system without noise suppression.

Such a transmission scheme is depicted in FIG. 2. A relatively straightforward reconstruction is accomplished by lumping all of the effects of the transmission channel and noise into a single operator $Q(\omega)$ 104, and then combining that operator with the received signal $R(\omega)$ 106 to reconstruct the sent signal $S(\omega)$ 105. This method is useful for situations where the changes in the transmission system are relatively slow as compared to the word rate, and the signal is at or above the noise level. The channel is time multiplexed with a known word 103 followed by an unknown data word 102. The known word is compared with the received data using techniques known in the art to determine a lumped transmission function Q(w) 104 for the system. In the next time step, this operator is used to recover the data. As shown in FIG. 2, each known, unknown word pair is independently used to reconstruct the received data word. As the rate of change of the communication channel increases, one can use the $Q(\omega)$ function from either side of an unknown data word to improve the reconstruction. Here a function $f[Q1(\omega),Q2(\omega)]$ is calculated and applied to the data in between. The value of $Q(\omega)$ may be monitored to provide an indication of the relative changes in the noise in the transmission channel.

Figure 3:
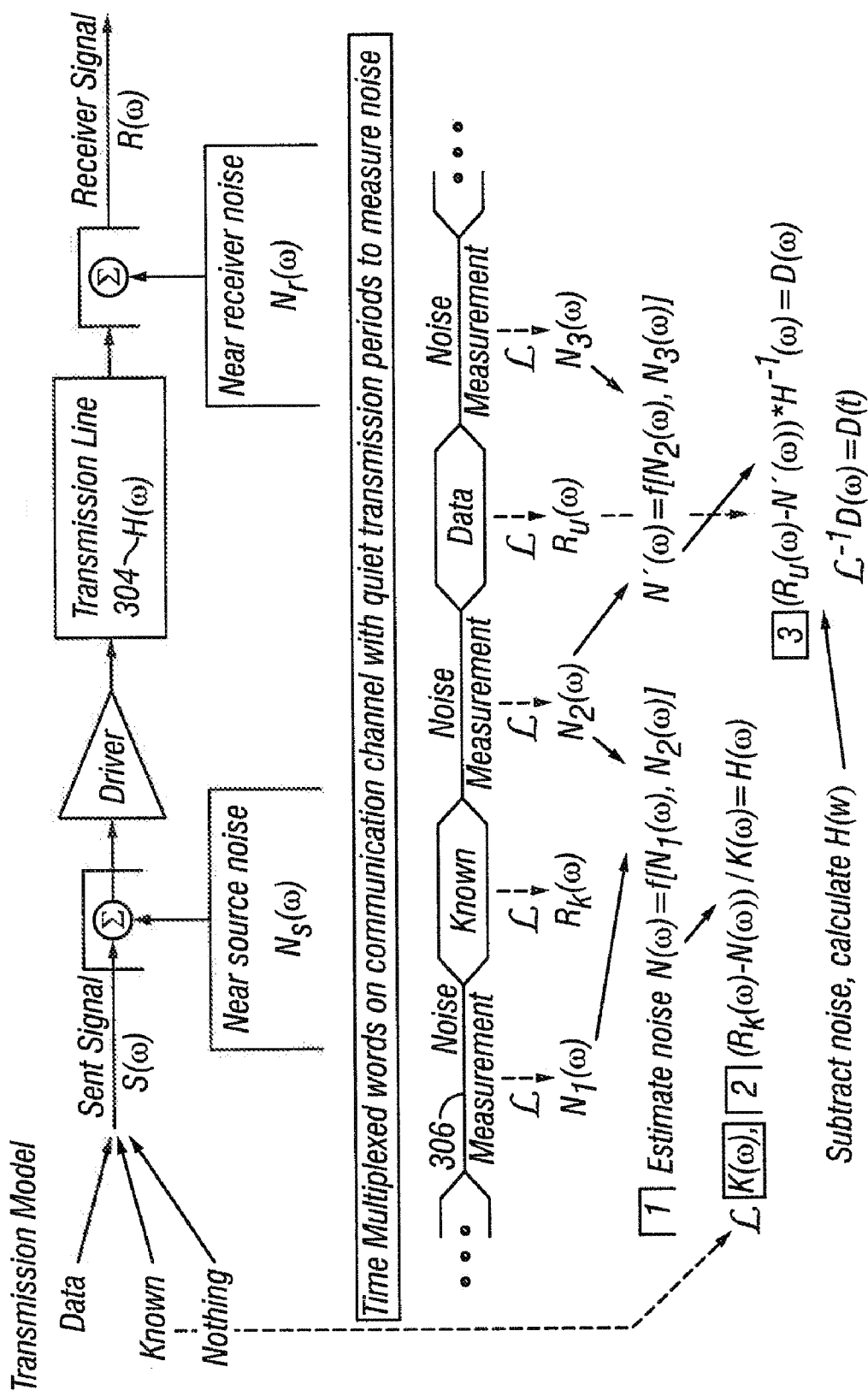
FIG. 3 is a block diagram depicting a single channel transmission system with noise suppression.

The previous signal reconstruction can be improved upon by separately estimating the noise in the transmission channel before attempting the reconstructions, as shown in FIG. 3., the transmission line transfer function $H(\omega)$ is determined after removing the noise estimate 306 and then the remaining operator is used to reconstruct the data signal. This method is useful for situations where the changes in the transmission system are relatively slow as compared to the word rate, however where the noise characteristic is varying at a rate comparable to the word rate. The transmission channel is time multiplexed with known words, unknown data words, and quiet periods when nothing is sent and in which the noise characteristic of the channel can be measured. The noise in a particular signal transmission window of time is estimated as a function $N(\omega)=f[N_1(\omega),N_2(\omega)]$ of the noise measurement on either side of the signal window. This function N(w) can be calculated using many methods including, but not limited to, simple averaging, curve fitting, or statistical methods known in the art. Once the noise is removed, the known word is compared with the received data to determine the transmission function $H(\omega)$ for the system. In the next time step, this operator is used to recover the data. Note that if there are noise periods on either side of the unknown data, the noise estimate may be re-estimated to account for any changes and allow for a better reconstruction of the unknown signal, as shown. As discussed before, the $H(\omega)$ and $N(\omega)$ functions may be monitored to indicate changes in the transmission channel. The method as described is particularly suited to situations where near receiver noise Nr is large. Noise at the source ends up lumped in the $H(\omega)$ calculation and can be an issue if the noise is rapidly varying.

Figure 4:
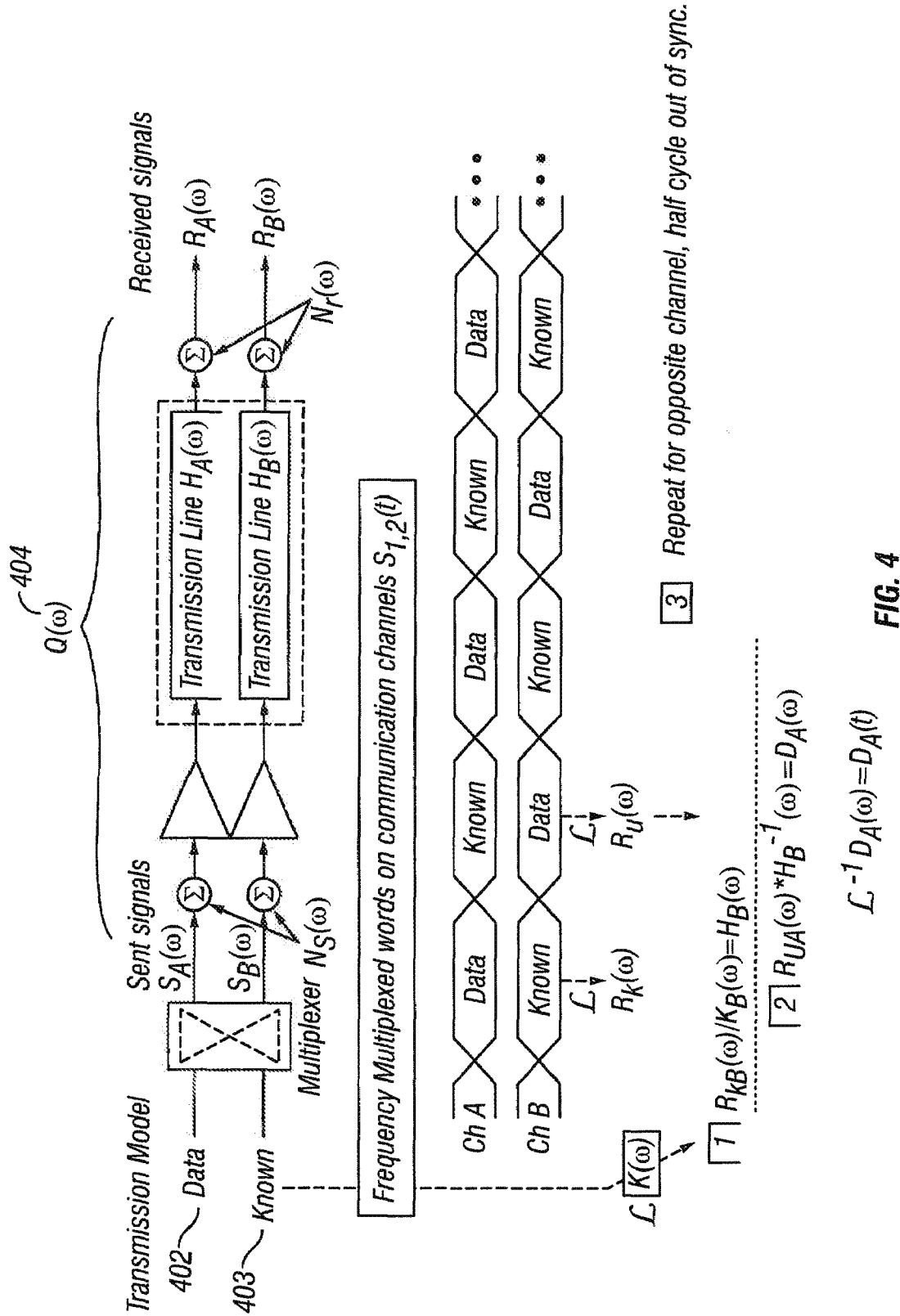
FIG. 4 is a block diagram depicting a dual channel transmission system without noise suppression.

As shown in FIG. 4, one can increase the effective bandwidth of the system by adding additional frequency multiplexed channels, each containing time multiplexed data and unknowns. The channels are still time multiplexed with a known word 403 followed by an unknown data word 402. The known word is compared with the received data to determine a lumped transmission function $Q(\omega)$ 404 for the particular channel. Once calculated, this operator is used to recover the data in the following time step. Each known, unknown word pair is independently used to reconstruct the data word. As the rate of change of the communication channel increases, the $Q(\omega)$ functions from either side on an unknown may be used to improve the reconstruction of the data signal. Here a function $f[Q_1(\omega), Q_2(\omega)]$ would be calculated as was the noise in the previous example, and applied to the data in between.

Figure 5:
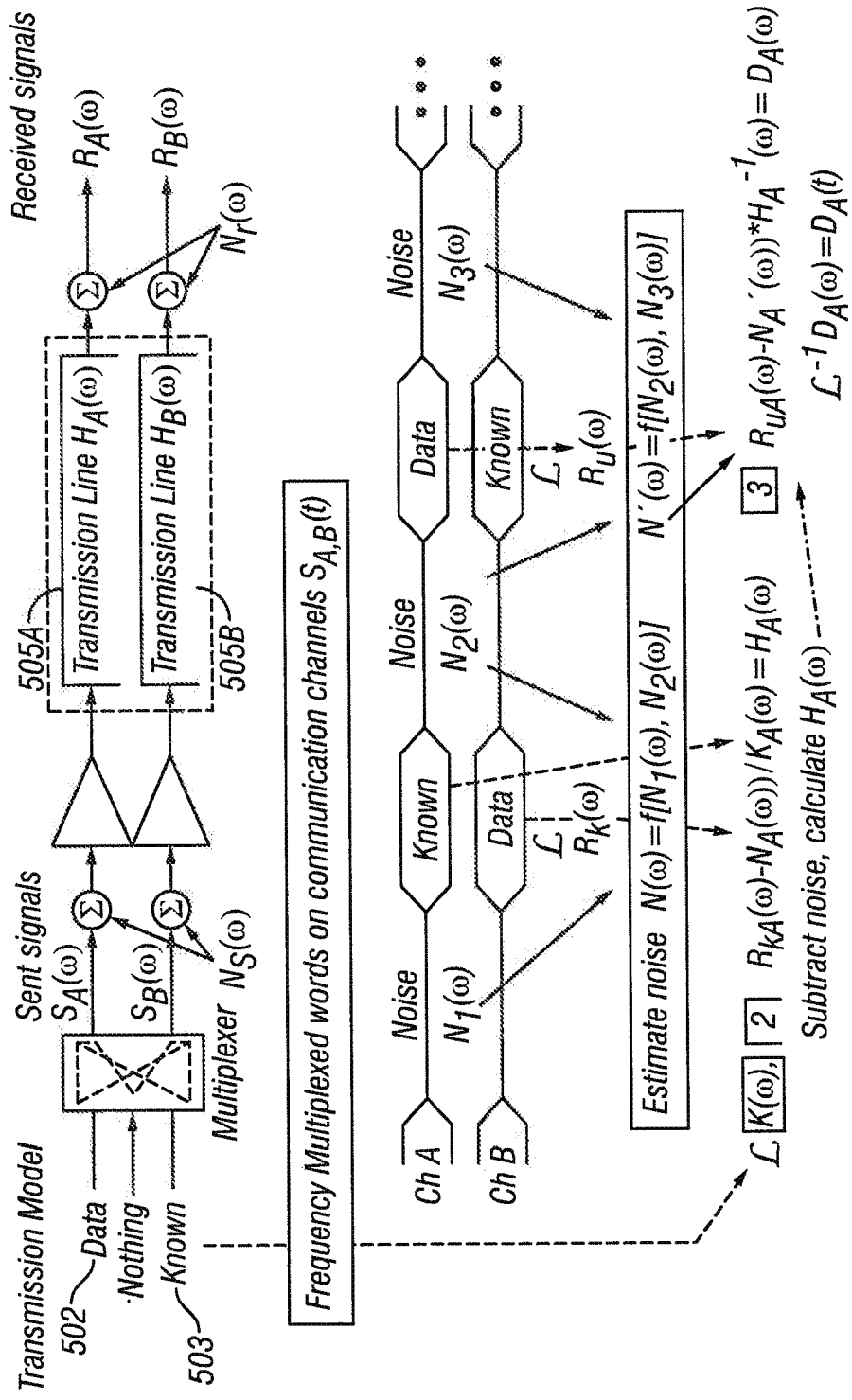
FIG. 5 is a block diagram depicting a dual channel transmission system with noise suppression.

As shown in FIG. 5, noise cancellation is added to the two channel case with the transmission line transfer function $H_n(\omega)$ determined after removing the noise estimate. The channels are still time multiplexed with a known word 503 followed by an unknown data word 502. The known word is compared with the reconstructed, received data to determine a lumped transmission function $H_n(\omega)$ for the particular channel 505 A,B. Once calculated, this operator is used to recover the data in the following time step. As shown, each known, unknown word pair is independently used to reconstruct the data word. As the rate of change of the communication channel or noise increases, one can use the $H(\omega)$ or $N(\omega)$ functions from either side on an unknown to improve the reconstruction. Here, the functions $f[H_1(\omega), H_2(\omega)]$ and $f[N_1(\omega), N_2(\omega)]$ would be calculated as was the noise function in the previous example, and applied to the data in between the noise channels. If $H_1(\omega)$ can be used to correctly predict $H_2(\omega)$ then it is possible to eliminate the multiplexer and keep the known words on one channel and the data words on the other. Throughput can be improved by increasing the number of data words over known words, provided the system characteristics are not varying rapidly, as previously mentioned.

Figure 6:
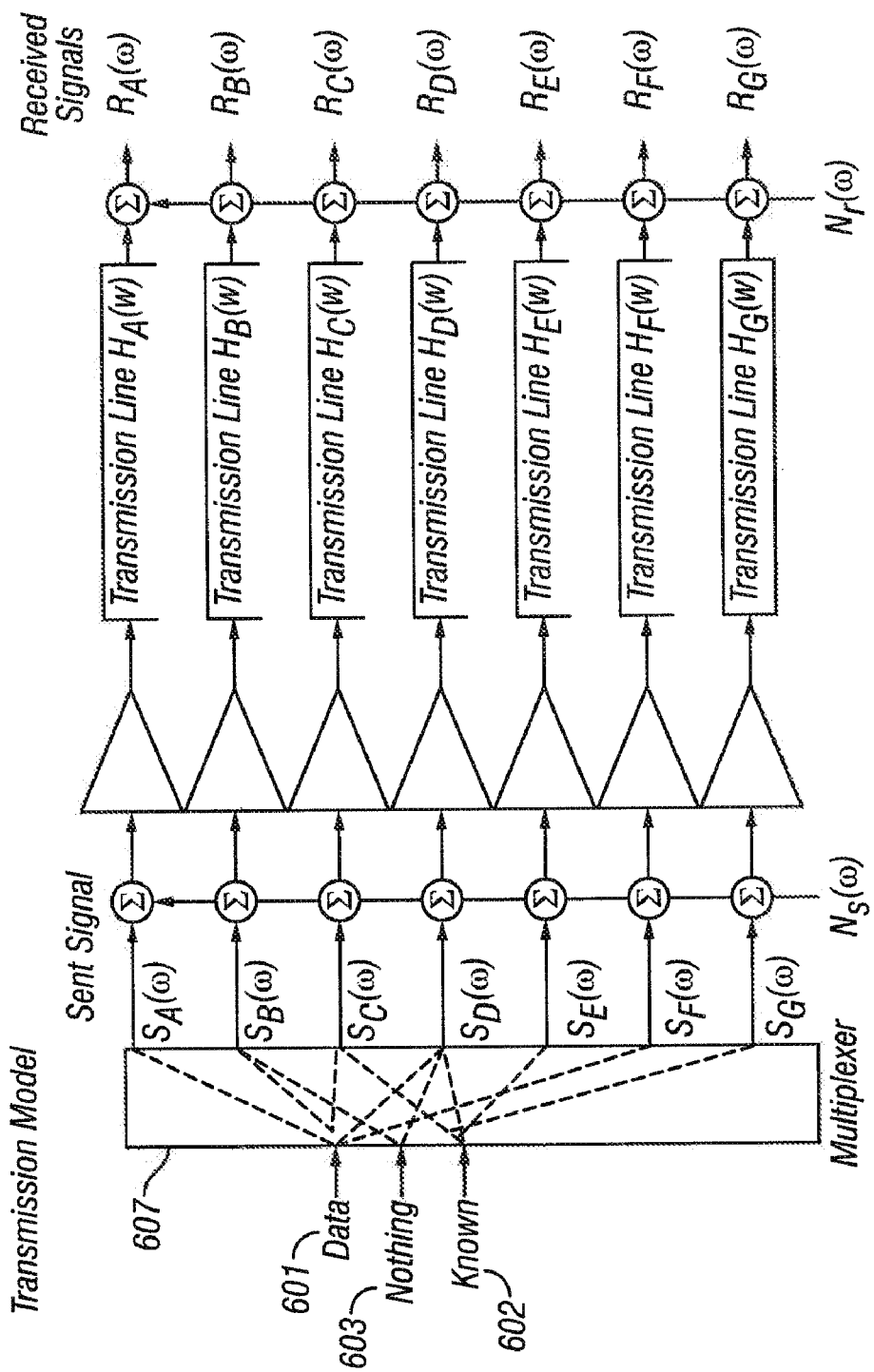
FIG. 6 is a block diagram depicting a spread spectrum multi-channel transmission system.

FIG. 6 shows an example of a multi-channel system wherein the known words 602 and the data words 601 are switched between different channels and interlaced with periods where no signal is sent 603. Each frequency segment of the transmission space may have different transmission and noise characteristics and as such must be treated differently. The multiplex switch 607 allows either data, known words, or nothing to be transmitted on any specific channel A-G at any time step according to a known protocol. The same protocol is used at the receiver end. Using the techniques previously described, the transmission line transfer function $H_n(\omega)$ may be determined to allow reconstruction of the desired data signals. One objective of the noise reduction is obtaining a good noise characterization such that:

$$R(\omega) + N(\omega) - N_{est}(\omega) = R(\omega) \quad (1)$$

Note that in the transmission model there are two noise sources, however they can be removed in a single action.

$$[S(\omega) + N_1(\omega)] * H(\omega) + N_2(\omega) = R(\omega) \quad (2)$$

$$S(\omega) * H(\omega) + [N_1(\omega) * H(\omega) + N_2(\omega)] = R(\omega) \quad (3)$$

The term $[N_1(\omega) * H(\omega) + N2(\omega)]$ can be treated as a single $N(\omega)$ term and is adequately estimated during the noise measurement periods.

Figure 7:
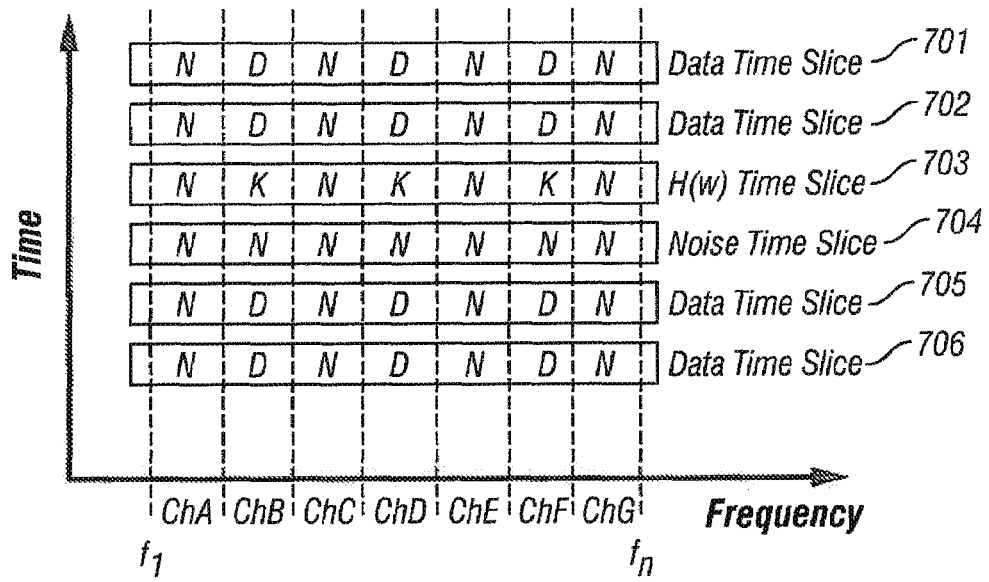
FIG. 7 is a diagram depicting a time multiplex map of a multi-channel transmission system.

FIG. 7 shows a channel map for the system of FIG. 6 wherein the channels A-G are time multiplexed to allow the functions of noise estimation, channel characterization, and data transmission to proceed. Within each time step, the various frequency segments carry the necessary signals to allow multiple simultaneous functions to proceed.

Figure 8:
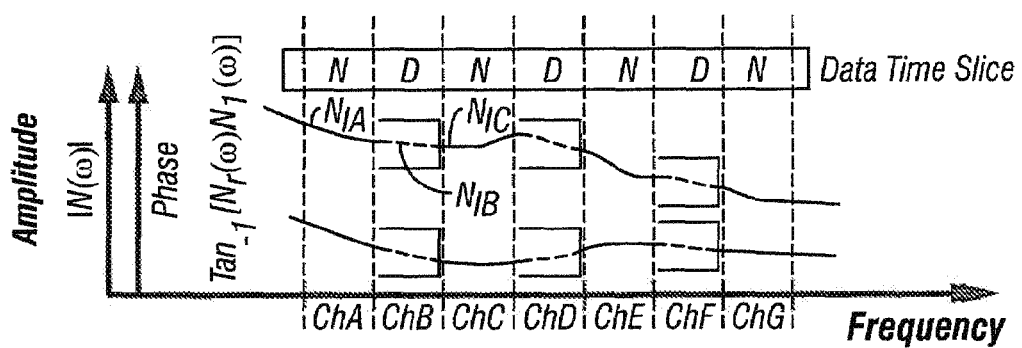
FIG. 8 is a diagram depicting the noise characterization used in the present invention.

During each normal data time slice 701-706, see FIG. 7, a new estimate of noise in the data channels Ch B, D, E can be estimated from the measurements in the dedicated noise channels Ch A, C, E, G. Both the amplitude and phase representations are modeled and used to accurately characterize the noise. Numerous known methods can be used including, but not limited to, linear approximation, exponential curve fitting, and polynomial curve fitting. As shown in FIG. 8, the noise fits $N_{1A}$, $N_{1C}$ in the adjacent noise channels Ch A, Ch C are extended through the data channel Ch B to provide a noise estimate $N_{1B}$ in the data channel. Once estimated, the noise in each specific data channel can be removed from the combined signal and noise in the data channel before de-convolving the transmission path, and recovering the desired data signal. This operation could be accomplished in either the frequency domain or the time domain.

Figure 9:
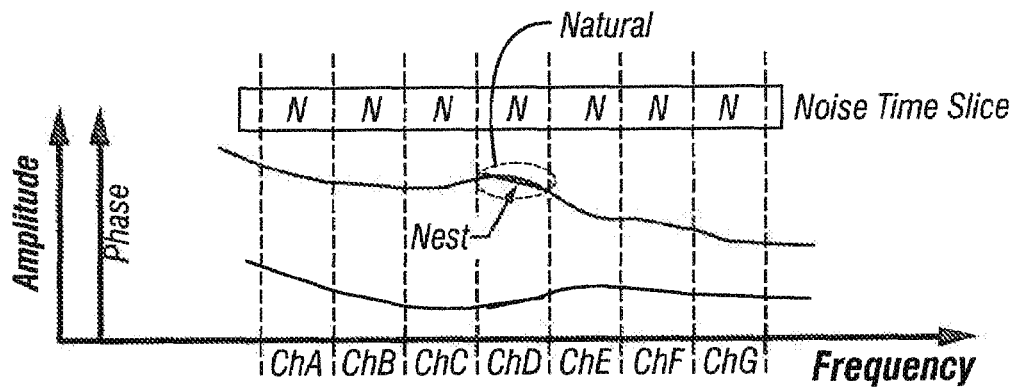
FIG. 9 is a diagram depicting the optimization of the noise characterization.

Periodically a time slice with no transmitted information can be used to check and optimize the estimate model being applied, see FIG. 9. By applying the model to the normal noise observation channels, measurements of the error between the actual noise $N_{act}$ and the model $N_{est}$, for example $N_{1C}$ in FIG. 8, can be designed determined and the model designed to adaptively reduce that error. If necessary, the entire model can be switched if the noise character dictates. Additionally, noise spikes and other phenomena which might cause a detection failure can be detected and those channels abandoned or switched adaptively. Once estimated, the noise model is optimized for that set of conditions, and the system continues to use the model, as tuned, until the next noise time slice is sent.

The rate at which noise slices must be sent is a function of how quickly the noise character is changing. By studying the quiescent state (noise slices), either the receiver or the sender can detect anomalous noise characteristics which will cause reduced reception and possibly switch spectrums or avoid specific channels, for example if spikes are present randomly.

Figure 10:
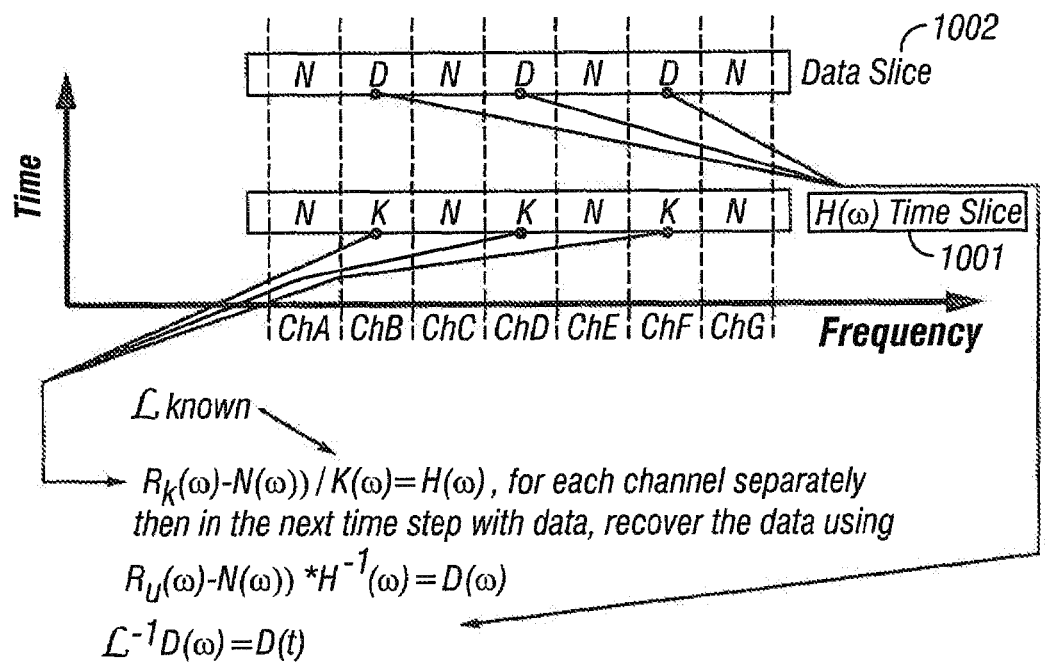
FIG. 10 is diagram depicting data channel characterization and data recovery according to the present invention.

After the noise has been removed, the transfer function of the transmission path is determined by sending a known word in place of the data. By using the same channel that the data is carried in, a more exact representation is obtained than that obtained from trying to interpolate/extrapolate from adjacent channels, see FIG. 10. In FIG. 10, the transmission channel transfer function $H(\omega)$ is determined for each of the frequency channels in time slice 1001. $H(\omega)$ is then combined with the measurements in time slice 1002 to extract the data signals.

Figure 11:
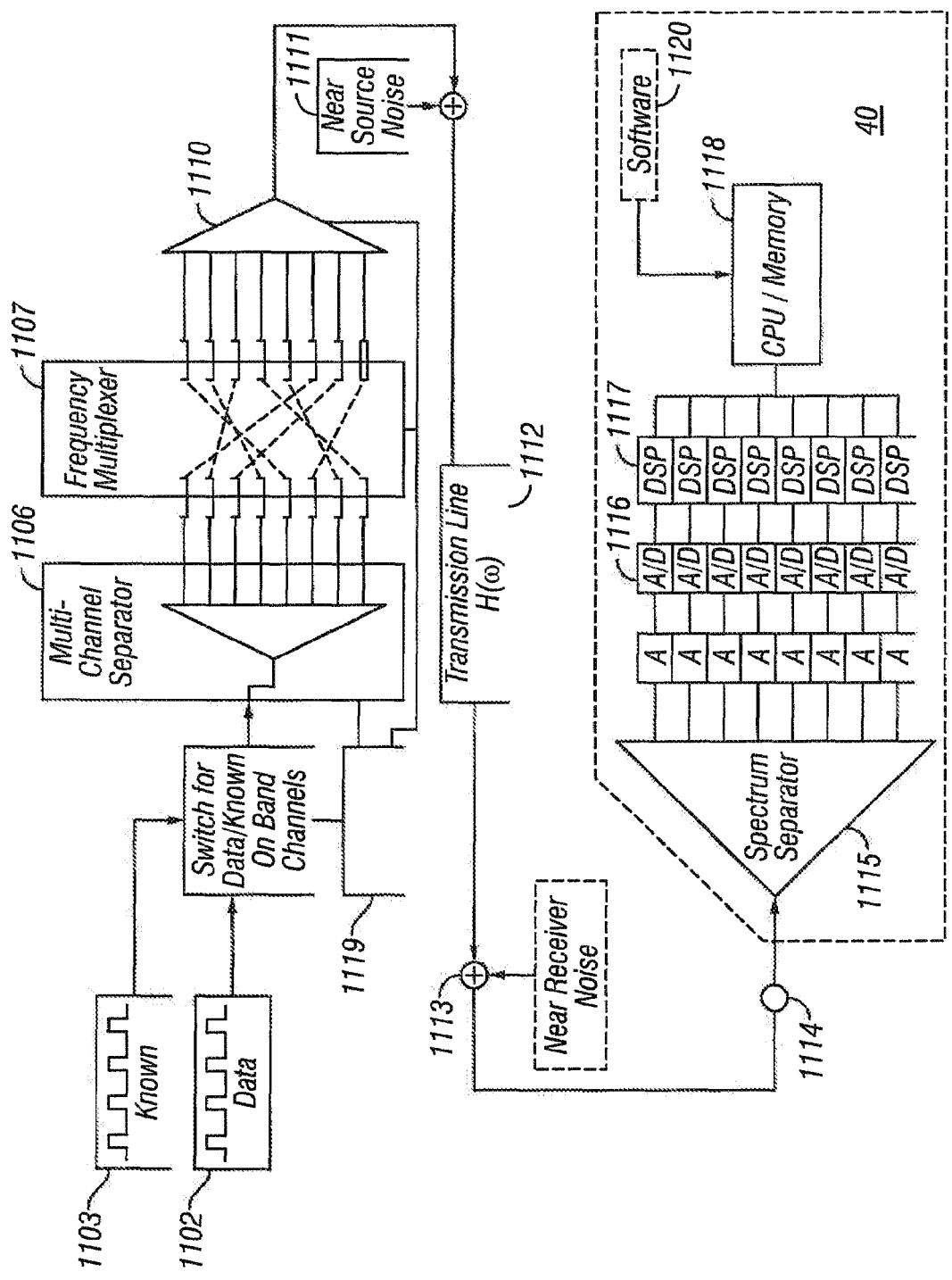
FIG. 11 is a block diagram of a hardware configuration for enabling the telemetry techniques of the present invention.

FIG. 11 depicts an exemplary hardware configuration for a system with N channels that would enable communication between a downhole system and a surface system as discussed previously. As shown in FIG. 11, data signal 1102 and known data word 1103 are transmitted through a switching device 1105 that is controlled by programmed instructions in controller 1119. Controller 1119 may contain circuits, such as analog driver circuits, digital signal processors (DSP), and a CPU with memory for controlling the operation of the downhole devices and transmitter 1110. Transmitter 1110 may be any mud pulser known in the art including, but not limited to, a positive pulse device, a negative pulse device, and a continuous wave device. Alternatively, transmitter 1110 may be an electromagnetic device, an acoustic device for transmitting stress waves through the drill string, a fluid acoustic device for transmitting acoustic signals through the drilling mud, wired drill pipe, or any other suitable transmitting device. Switching device 1105 places the data signal and the known word in the data stream according to a protocol stored in the controller 1119. The data stream may be transmitted over a single frequency band or over multiple frequencies using multi-channel separator 1106 and frequency multiplexer 1107. The communication concepts disclosed herein can be used with any number of data channels, however as few as one data and two sideband noise band channels can be used.

If spread spectrum is used, the data and optional injected noise are broken into known spread spectrum channels by a Multi-Channel Driver (MCD) 1106 known to those skilled in the communication field. MCD 1106 may be adapted to further spread the spectrum so as to allow a noise channel to be placed between each data channel. The frequency width of the data and noise channels are known and may be altered as data through-put and/or noise conditions change. The width of the data and noise bands are known or transmitted in advance to the receiver. After final processing within MCD 1106, a number of data and noise channels are present and in one embodiment the noise channel count would be one greater than the data channel count.

Transmitter 1110 transmits the signals over transmission line 1112 that, in the present exemplary system, is drilling fluid 31 within drill string 22. Near source noise 1111 is imposed on the transmitted signals. As previously mentioned, noise 1111 may include, but is not limited to, fluid turbulence noise from the drill bit and drill string vibration induced fluid pressure fluctuations. As the signal approaches receiver 1114, the signal is further contaminated by near receiver noise 1113. Near receiver noise 1113 includes, but is not limited to, rig vibration induced fluid noise and mud pump fluctuations and harmonics. Receiver 1114, which for a mud pulse transmission may be pressure sensor 43, receives the signals. In the primary case discussed herein a single receiver is used to capture a composite time domain data stream which will also contain system noises as discussed above. This composite signal would be routed to spectrum separator 1115 that may perform a frequency transform, such as an FFT, that would return the as received analog time domain signal to an analog frequency domain channel separated signal similar to the spread spectrum signal that was transmitted. Spectrum separator 1115 re-creates the same number of channels that have the same frequency bands and widths as were defined transmitted by Multi-Channel Driver 1106. The following processes are common for all N number of channels of the signal. Each isolated frequency channel is digitized by A/D 1116. The frequency domain isolated channel signals are fed to a network of channel specific DSP units 1117 that are in turn coupled with one or more central processing units (CPU) 1118. This network of DSPs and CPU(s), acting under programmed software instructions 1120 performs all of the necessary operations to determine the channel specific noise, estimate the noise in the data channels, remove the noise, estimate a unit or channel specific transform function, apply the transform function and produce as series of channel specific data streams that can be recombined to create an as transmitted data stream. The generation of such software instructions is within the capability of one skilled in the art, without undue experimentation.

Figure 12:
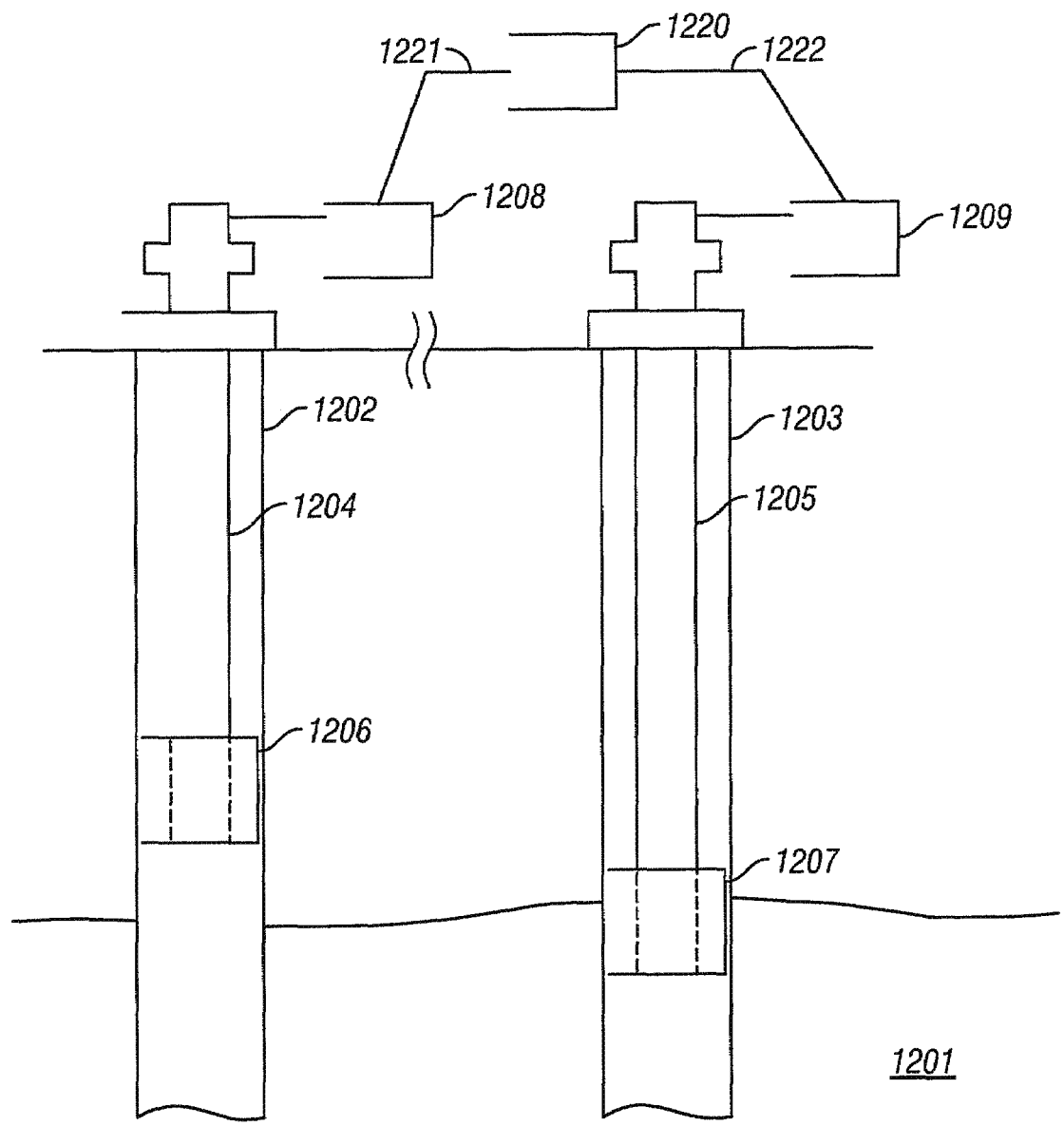
FIG. 12 is a sketch of a multi-well production system using the system of the present invention.

In another embodiment, see FIG. 12, production wells 1202 and 1203 have tubing strings 1204 and 1205 disposed therein, respectively. Tubing strings 1204, 1205 extend to producing reservoir 1201. Downhole flow control devices 1206 and 1207 are connected to tubing strings 1204 and 1205 respectively and control the flow from reservoir 1201. Flow control devices 1206 and 1207 transmit data from sensors (not shown) contained in each flow control device. The data includes, but is not limited to; parameters related to the status of the flow control device; parameters related to the flowing fluid; and parameters related to the properties of reservoir 1201. The data may be transmitted to the surface by hardwire, by acoustic stress wave transmission through the tubing; and/or by EM telemetry through the earth. The downhole transmitted parameters are received at controllers in the surface systems 1208 and 1209 and relayed to a central controller 1220 along lines 1221 and 1222 for controlling the production of reservoir 1201 according to a predetermined plan. Noise may be present in each data transmission path thereby interfering with the data signals to controller 1220 and causing the data signals to be missed and/or misinterpreted resulting in control of flow from reservoir 1201 that is not according to the desired plan. The techniques described herein may be employed to enhance the recovery of such data. While illustrated with two wells, it is understood that any number of such wells may be employed with this system.

Figure 13:
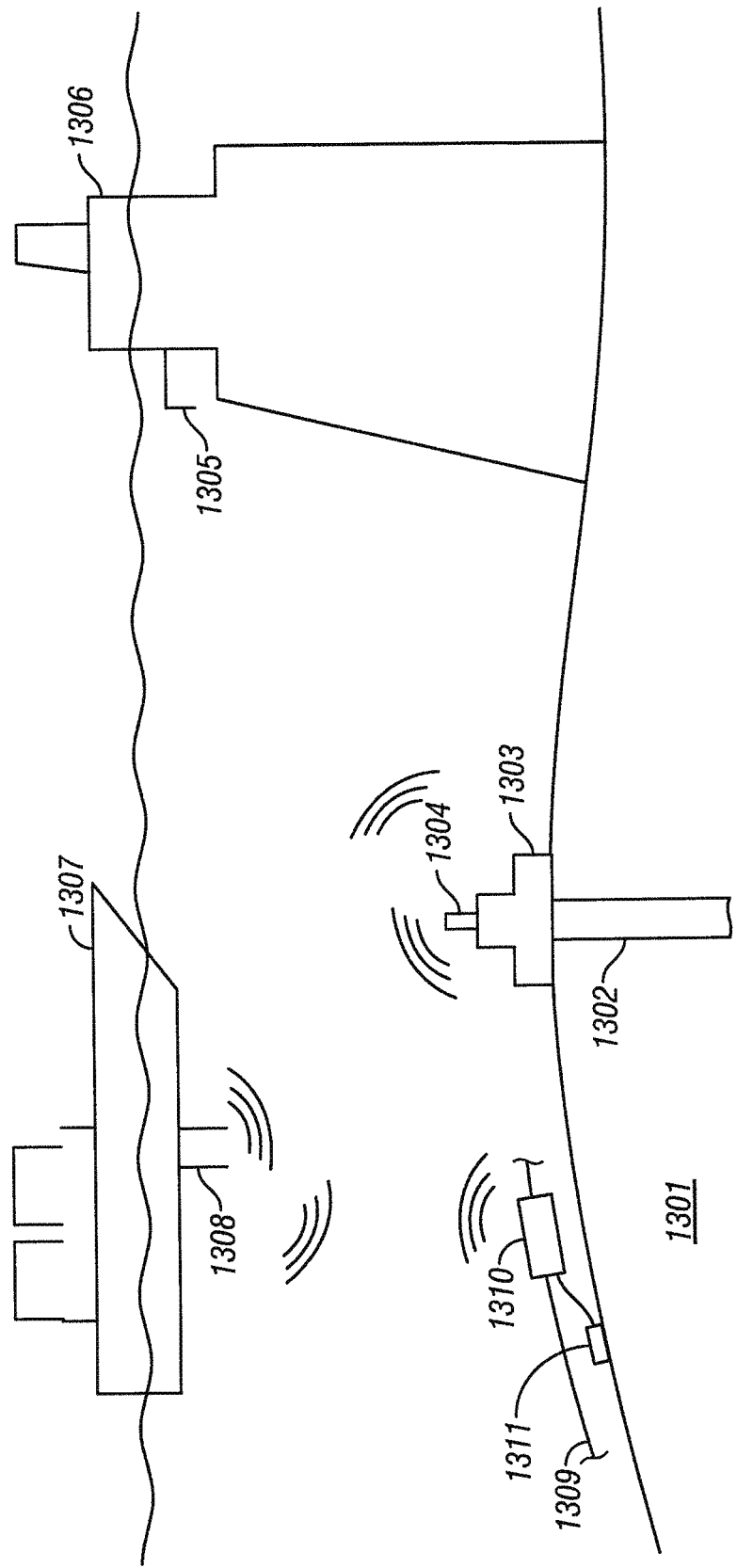
FIG. 13 is a sketch of sub-sea applications employing the apparatus and methods of the present invention.

In another embodiment, see FIG. 13, the present invention is used in conjunction with sub-sea acoustic signal transmission to eliminate noise present in such acoustic signals. As shown, unidirectional, or alternatively bi-directional, acoustic signals are transmitted between various devices in water 1311. In one embodiment, sub-sea well station 1303 is connected to well 1302 that penetrates and produces reservoir 1301. Data related to the operation of well 1302 may be transmitted from acoustic transponder 1304 to a related receiver 1305 on platform 1306 and/or transponder 1308 on vessel 1307. Such transponders are commercially available and commonly operate at frequencies of about 1-30 kHz. Such devices may employ both a transmitter and a receiver thereby enabling two way communication. Commands may be transmitted from transponders 1308 and/or 1305 to transponder 1304 for controlling the flow from reservoir 1301. Such systems are susceptible to wave noise and mechanical noise when in the vicinity vessels and offshore equipment. The apparatus and methods of the present noise reduction techniques may be employed in such a system to enhance system reception and reliability.

In another embodiment in FIG. 13, transponder 1308 on vessel 1307 is used to communicate with transponder 1310 located in cable 1309 on the seafloor. Transponder 1310 has a controller (not separately shown) that is adapted to determine the operational status of cable 1309. Alternatively, the controller in transponder 1310 may receive sensor data from sensors 1311 in or attached to cable 1310. In one embodiment cable 1310 is a seismic cable and sensor 1311 is a geophone adapted for seafloor seismic measurements. In another embodiment, sensor 1311 is a sensor for determining the transmission status of a sub-sea communication cable, for example a transoceanic cable. Data from sensor 1311 may be transmitted to transponder 1308 for evaluation at the surface. In addition, when cable 1309 is used as a seismic cable, operating commands may be transmitted from vessel 1307 through transponder 1308 to transponder 1310 to set sensor acquisition windows or any other appropriate operating parameter. When used as a communications cable, commands from vessel 1307 may be transmitted through transponder 1308 to transponder 1310 to set appropriate operational parameters within cable 1310. The noise reduction and transmission techniques of the present invention may be used to ensure reliable communications between the surface and sub-sea systems.

It should be noted that the apparatus and noised reducing methods described herein are applicable to substantially any system of communication where substantial noise is present in the communication frequency channel. This includes but is not limited to; telecommunications, including cell phone; space communications; RF communications; hardwired communications; and microwave communications. Likewise, the transmitters and receivers may be positioned at locations including, but not limited to, surface locations, subsurface locations, airborne locations, sea surface locations, sub-sea locations, and outer space locations.

The present invention has been described as a method and apparatus operating in a downhole environment. However, the present invention may also be embodied as a set of instructions on a computer readable medium comprising ROM, RAM, CD ROM, DVD, FLASH or any other computer readable medium, now known or unknown, that when executed causes a computer, such as, for example, a processor in downhole controller 1119 and/or a processor in surface controller 40, to implement the methods of the present invention.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A system for transmitting information between a first location and a second location, comprising:
   a transmitter disposed at one of the first location and the second location transmitting a data signal and a known signal over a signal channel having a noise component therein;
   a receiver disposed at the other of the first location and the second location receiving the data signal, the known signal, and the noise component; and
   a control unit operatively connected to the receiver processing the received known signal to obtain an estimate of a channel transmission function and to combine the estimated channel transmission function with the received data signal to reconstruct the transmitted data signal.

2. The system of claim 1, wherein the transmitter is adapted to transmit a signal chosen from the group consisting of: a mud pulse signal, a fluid borne acoustic signal, an acoustic stress wave signal, an electromagnetic signal, and a radio frequency signal.

3. The system of claim 1, wherein the first location and the second location are each chosen from the group consisting of: a surface location, a downhole location, an airborne location, an outer space location, a sea surface location, and a sub-sea location.

4. The system of claim 1, wherein the control unit contains circuits and a processor with memory.

5. The system of claim 1, wherein the signal channel comprises a plurality of signal channels and the transmitter is adapted to transmit a multi-channel signal within at least two of the plurality of signal channels.

6. The system of claim 1, wherein the signal channel comprises a discrete frequency range.

7. The system of claim 5, wherein each of the plurality of signal channels comprises a different discrete frequency range.

8. The system of claim 1, wherein the transmitter transmits an alternating sequence of the data signal and the known signal.

9. The system of claim 8, wherein the transmitter ceases transmitting during a quiet period during which the noise component is estimated.

10. A method of transmitting information between a first location and a second location, comprising:
    transmitting a data signal and a known signal from one of the first location and the second location over a signal channel having a noise component;
    receiving the data signal and the known signal and the noise component at the other of the first location and the second location;
    processing the received known signal to obtain an estimate of a channel transmission function;
    combining the estimated channel transmission function with the received data signal to reconstruct the transmitted data signal.

11. The method of claim 10, wherein the transmitted data signal is chosen from the group consisting of: a mud pulse signal, a fluid borne acoustic signal, an acoustic stress wave signal, an electromagnetic signal, and a radio frequency signal.

12. The method of claim 10, wherein the first location and the second location are each chosen from the group consisting of: a surface location, a downhole location, an airborne location, an outer space location, a sea surface location, and a sub-sea location.

13. The method of claim 10, wherein the signal channel comprises a plurality of signal channels and the data signal and known signal are transmitted as a multi-channel signal within at least two of the plurality of signal channels.

14. The method of claim 10, wherein the signal channel comprises a discrete frequency range.

15. The method of claim 13, wherein each of the plurality of signal channels comprises a different discrete frequency range.

16. The method of claim 10, wherein the transmitted signal comprises an alternating sequence of a data signal and a known signal.

17. The method of claim 16, wherein the known signals adjacent either side of the data signal are both used to obtain an estimate of the channel transmission function.

18. The method of claim 10, wherein the step of processing the received known signal to obtain an estimate of the channel transmission function includes at least partly processing the received known signal in the frequency domain.

19. The method of claim 16 further comprising ceasing transmitting during a quiet period during which the noise component is estimated.

20. A method of transmitting information between a first location and a second location, comprising:
    transmitting a data signal and a known signal from one of the first location and the second location over a signal channel having a first noise component;
    measuring a second noise component in a noise channel proximate the signal channel;
    receiving the data signal, the known signal, and the first noise component at the other of the first location and the second location;
    estimating the first noise component based on the second noise component;
    combining the estimated first noise component with the received data signal and the received known signal to generate a noise-cancelled received data signal and a noise-cancelled received known signal;
    processing the noise-cancelled received known received signal to obtain an estimate of a channel transfer function;
    combining the estimated channel transfer function with the noise-cancelled received data signal to reconstruct the transmitted data signal.

21. The method of claim 20, wherein the transmitted data signal is chosen from the group consisting of: a mud pulse signal, a fluid borne acoustic signal, an acoustic stress wave signal, an electromagnetic signal, and a radio frequency signal.

22. The method of claim 20, wherein the first location and the second location are each chosen from the group consisting of: a surface location, a downhole location, an airborne location, an outer space location, a sea surface location, and a sub-sea location.

23. The method of claim 20, wherein the signal channel comprises a plurality of signal channels and the data and known signals are transmitted as a multi-channel signal within at least two of the plurality of signal channels.

24. The method of claim 23, wherein each of the plurality of signal channels has a noise channel proximate thereto.

25. The method of claim 20, wherein the signal channel comprises a discrete frequency range.

26. The method of claim 23, wherein each of the plurality of signal channels comprises a different discrete frequency range.

27. The method of claim 20, wherein the transmitted signal comprises an alternating sequence of a data signal and a known signal.

28. The method of claim 27, wherein the known signals adjacent either side of the data signal are both used to obtain an estimate of the channel transmission function.

29. The method of claim 20, wherein the noise channel comprises a first noise channel having a third noise component and a second noise channel having a fourth noise component proximate either side of the signal channel wherein the first noise component is estimated from a combination of the third noise component and the fourth noise component.

30. The method of claim 20, wherein the step of combining the estimated first noise component with the received data signal and the received known signal to generate a noise-cancelled received data signal and a noise-cancelled received known signal is at least partly performed in the frequency domain.

31. The method of claim 20 further comprising ceasing transmitting in the signal channel during a quiet period during which the first noise component is estimated.

32. A system for transmitting information between a surface location and a downhole location in a well, comprising:
   a transmitter disposed in a tubular string extending in a wellbore and transmitting a data signal and a known signal over a signal channel having a noise component therein;
   a receiver disposed at the surface location receiving the data signal, the known signal, and the noise component; and
   a control unit operatively connected to the receiver processing the received known signal to obtain an estimate of a channel transmission function and to combine the estimated channel transmission function with the received data signal to reconstruct the transmitted data signal.

33. The system of claim 32, wherein the transmitter is adapted to transmit a signal chosen from the group consisting of: a mud pulse signal, a fluid borne acoustic signal, an acoustic stress wave signal, an electromagnetic signal, and a radio frequency signal.

34. The system of claim 32, wherein the control unit contains circuits and a processor with memory.

35. The system of claim 32, wherein the signal channel comprises a plurality of signal channels and the transmitter is adapted to transmit a multi-channel signal within at least two of the plurality of signal channels.

36. The system of claim 32, wherein the signal channel comprises a discrete frequency range.

37. The system of claim 35, wherein each of the plurality of signal channels comprises a different discrete frequency range.

38. The system of claim 32, wherein the transmitter transmits an alternating sequence of the data signal and the known signal.

39. The system of claim 38, wherein the known signals adjacent either side of the data signal are both used to obtain an estimate of the channel transmission function.

40. The system of claim 32, wherein the wellbore comprises a production wellbore.

41. The method of claim 32 further comprising ceasing transmitting in the signal channel during a quiet period during which the noise component is estimated.

* * * * *